(12) United States Patent
Berger

(10) Patent No.: US 8,523,257 B1
(45) Date of Patent: Sep. 3, 2013

(54) SPECIALIZED COVER FOR PROTECTING FREIGHT WHILE IN TRANSIT

(75) Inventor: Carl E. Berger, Florence, KY (US)

(73) Assignee: Amazon Technologies, Inc., Reno, NV (US)

( * ) Notice: Subject to any disclaimer, the term of this patent is extended or adjusted under 35 U.S.C. 154(b) by 5 days.

(21) Appl. No.: 13/338,653

(22) Filed: Dec. 28, 2011

(51) Int. Cl.
*B62D 33/04* (2006.01)
*B60P 7/08* (2006.01)

(52) U.S. Cl.
USPC .................... 296/24.4; 410/118; 410/140

(58) Field of Classification Search
USPC .............. 296/24.4, 100.01; 410/118, 129, 410/140; 160/290.1
See application file for complete search history.

(56) References Cited

U.S. PATENT DOCUMENTS

| 4,639,031 A * | 1/1987 | Truckenbrodt | 296/24.41 |
| 5,382,068 A * | 1/1995 | Simmons et al. | 296/24.41 |
| 6,406,232 B1 * | 6/2002 | Snitker et al. | 410/142 |
| 2008/0069659 A1 * | 3/2008 | Carson | 410/103 |

* cited by examiner

*Primary Examiner* — H Gutman
(74) *Attorney, Agent, or Firm* — Thomas/Horstemeyer, LLP

(57) ABSTRACT

The re-usable cover for protecting freight while in transit includes an upper end for attachment to the rear end opening of a freight container, a pair of side edges adjacent to a respective side of the rear end opening of the freight container when the upper end is attached, and a front surface configured to face the exterior of the freight container when the upper end is attached.

21 Claims, 4 Drawing Sheets

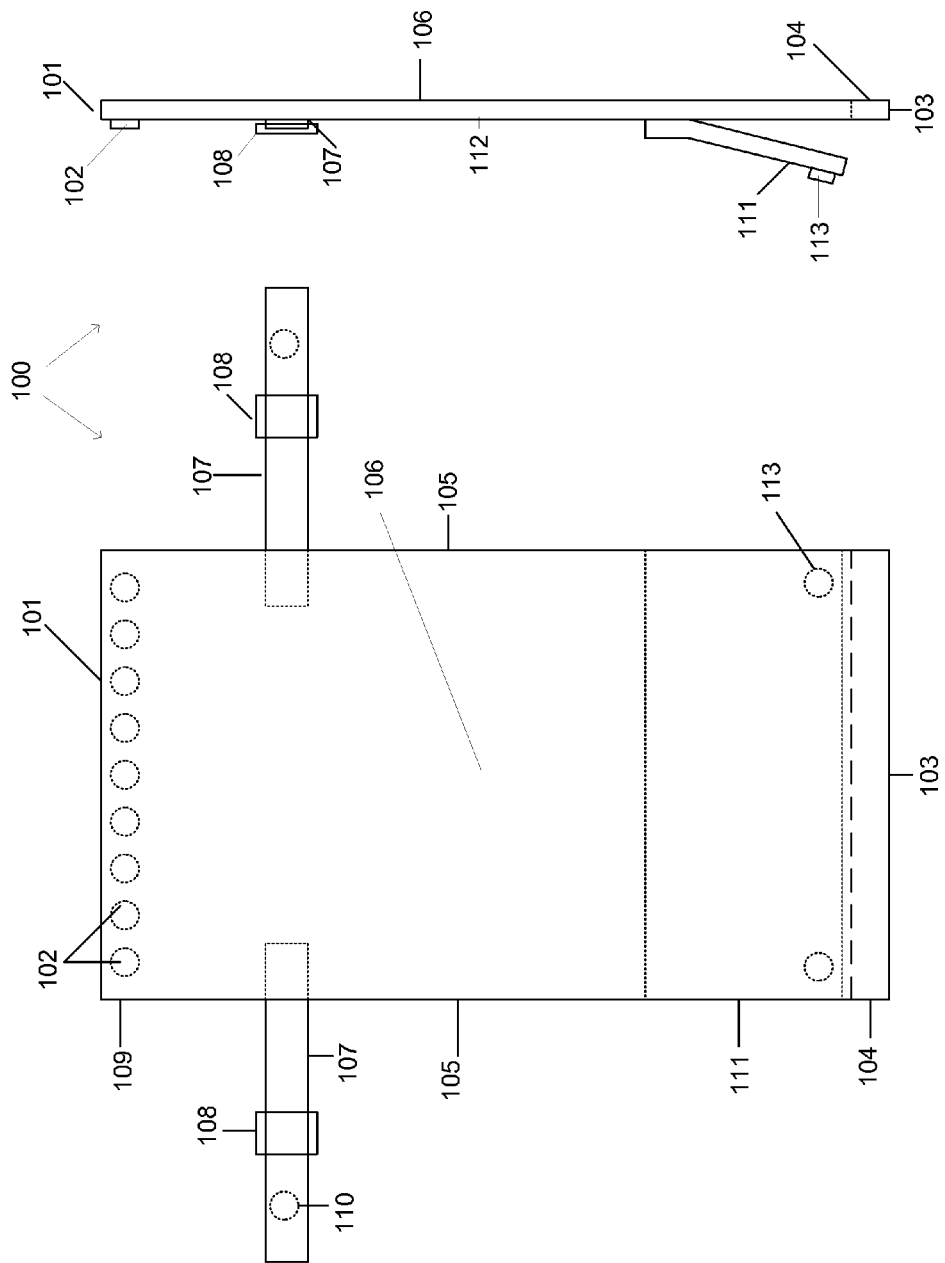

SPECIALIZED COVER FOR PROTECTING FREIGHT WHILE IN TRANSIT

BACKGROUND

Freight containers, for example, tractor trailers, intermodal containers, and the like, include doors fitted at one end that may not create a sufficient seal when closed. Thus, freight in transit can potentially be damaged by water and/or debris entering the rear of the container.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 1A is a drawing of a front view of the cover for protecting freight while in transit according to various embodiments of the present disclosure.

FIG. 1B is a drawing of a side view of the cover of FIG. 1A for protecting freight while in transit according to various embodiments of the present disclosure.

DETAILED DESCRIPTION

Figure 2A:
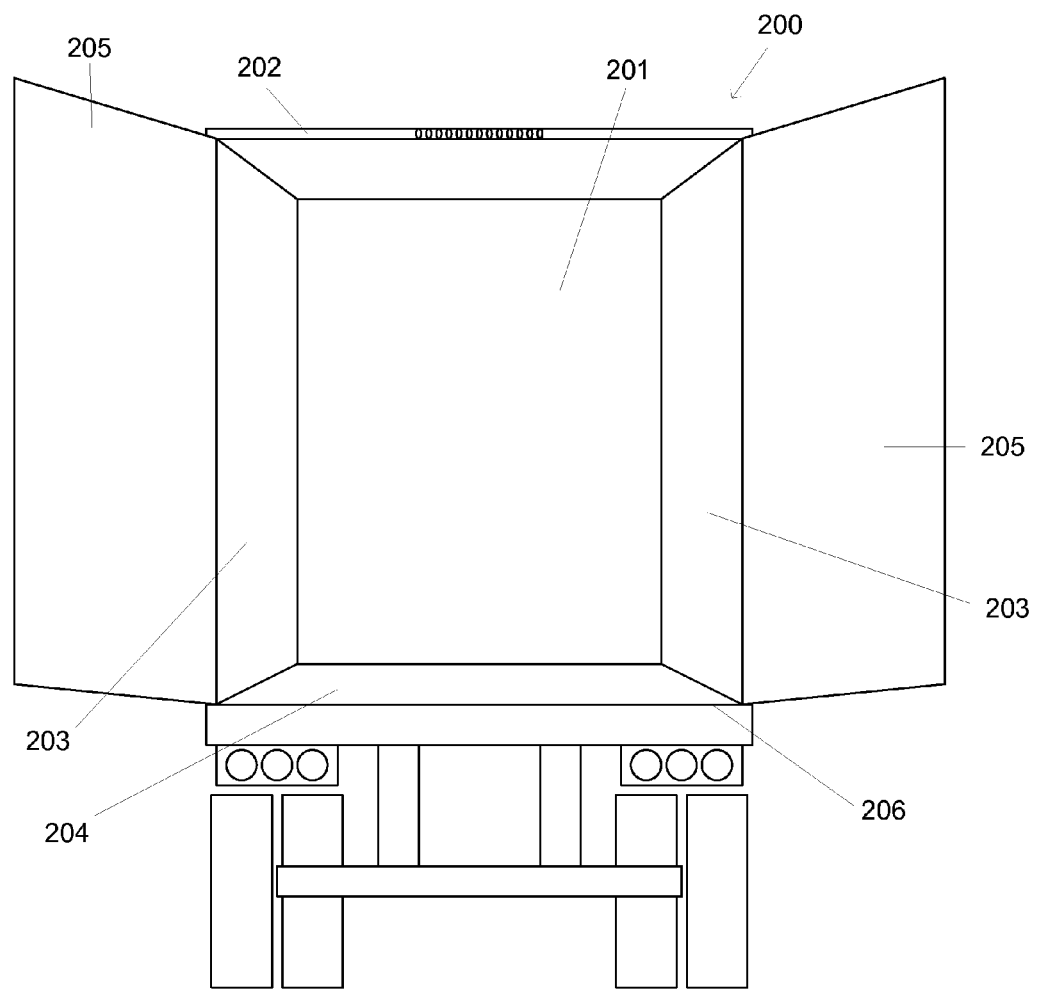
FIG. 2A is a drawing of a rear end view of a freight container with its doors open according to various embodiments of the present disclosure.

The present disclosure relates to a re-useable cover for protecting freight while in transit. The cover of the present disclosure is configured to be attached to a freight container, for example, a tractor trailer, to protect freight from water and/or debris entering through the rear end during transport. In the following discussion, a general description of the cover and its components is provided, followed by a discussion of the method of using the same.

With reference to FIGS. 1A and 1B, shown is a cover for protecting freight while in transit 100 according to various embodiments. The cover 100 includes an upper end 101 which includes at least one magnet 102 for attachment to the top portion of a rear end opening of a freight container. In one embodiment, the upper end 101 can include a plurality of magnets 102. The plurality of magnets 102 can be positioned horizontally along the top of the upper end 101. The plurality of magnets 102 can be evenly spaced along the top of the upper end 101, or spaced at differing intervals.

The cover 100 includes a pair of side edges 105, each being configured to be positioned adjacent to a respective side of the rear end opening of a freight container. The cover includes a front surface 106 configured to face the exterior of a freight container when the upper end 101 is attached to the top of the rear end opening of the freight container. The cover 100 further includes a lower end 103 with a lower portion 104 configured to extend beyond a bottom of the rear end opening of a freight container.

In an embodiment of the present disclosure, the cover 100 includes at least one strap 107 extending from each of the two side edges 105. In another embodiment, each strap 107 includes a buckle 108 for adjusting the length of the strap 107. In another embodiment, each strap 107 includes at least one magnet 110. The magnet(s) 110 can be used to affix the strap(s) 107 to the interior side surface of a freight container adjacent to a respective side edge 105.

In an embodiment of the present disclosure, the cover 100 includes a flap portion 111 affixed to a lower portion of a back surface 112 of the cover and at least one magnet 113 affixed to a bottom end of the flap portion 111. The flap portion 111 is configured to be affixed to an interior bottom surface of a freight container when the upper end 101 of the cover 100 is attached to the top portion of the rear end opening of the freight container. In an embodiment, the flap portion 111 is affixed to the back surface 112 of the cover about 2 to 3 feet above the lower end 103 of the cover. The flap portion 111 may be attached to the cover via stitching, adhesive, or other means of attachment.

Figure 2B:
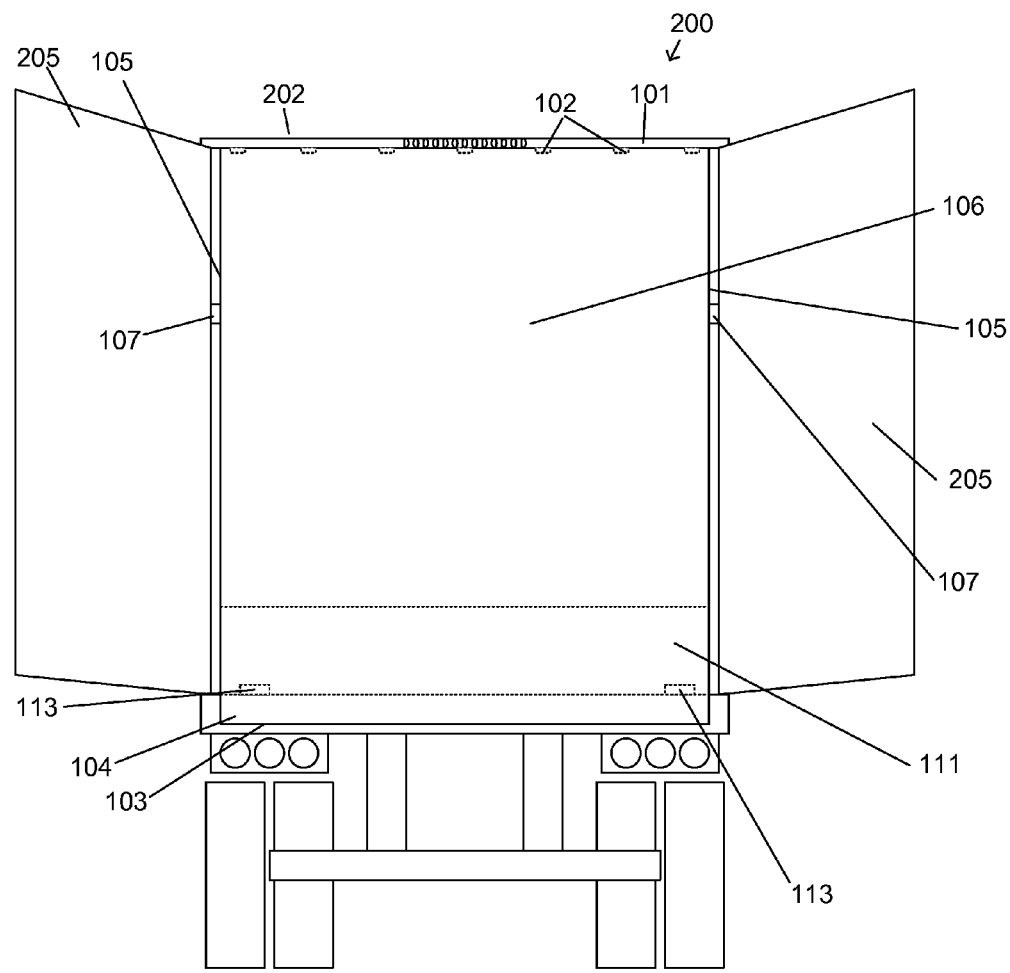
FIG. 2B is a drawing of the cover of FIG. 1A for protecting freight while in transit attached to the freight container of FIG. 2A with its doors open according to various embodiments of the present disclosure.
Figure 2C:
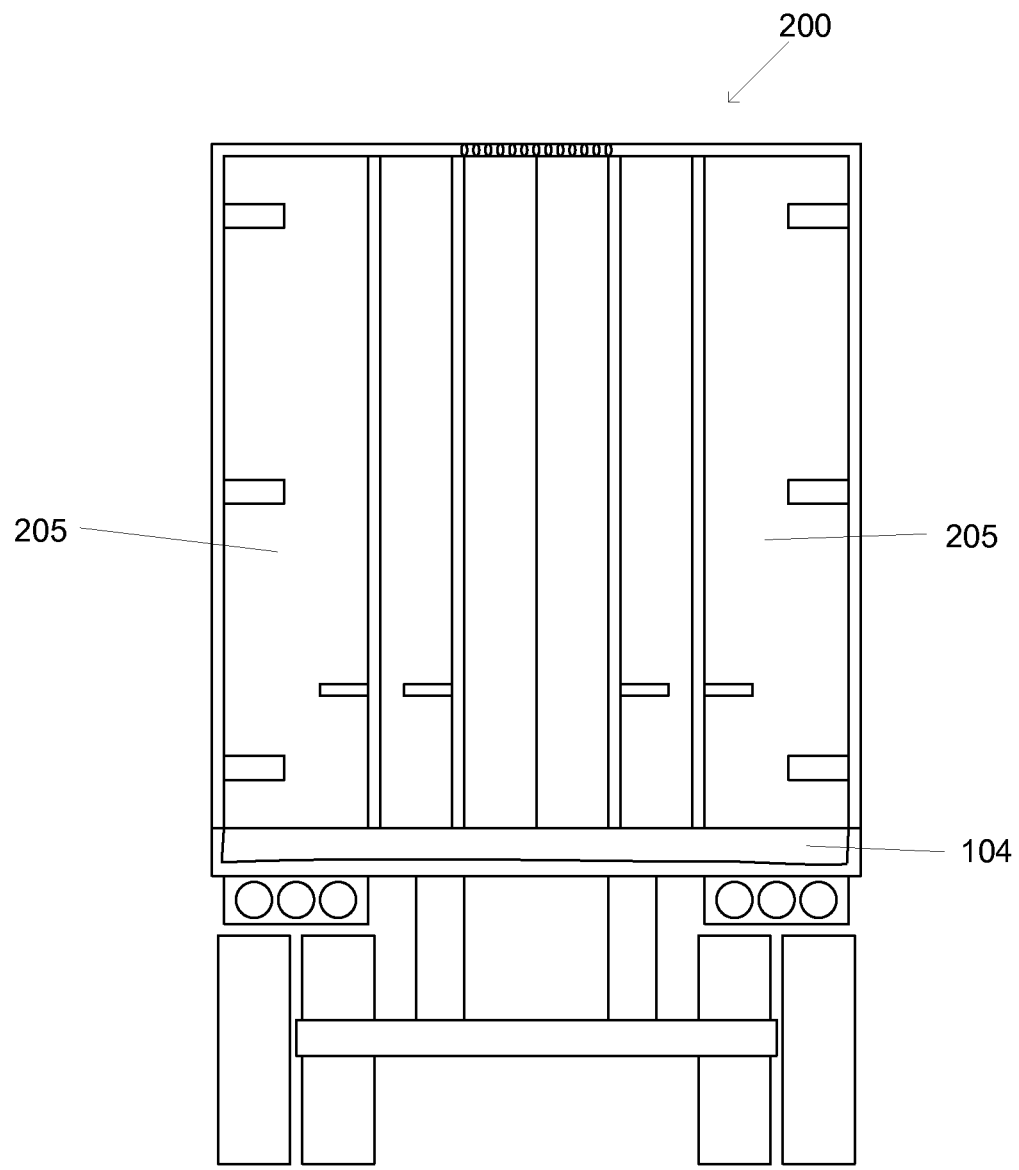
FIG. 2C is a drawing of the cover of FIG. 1A for protecting freight while in transit attached to the freight container of FIG. 2A with its doors closed according to various embodiments of the present disclosure.

Referring next to FIGS. 2A, 2B, and 2C, shown is the cover 100 as used with a freight container 200. The freight container 200 includes a rear end opening 201, a top portion 202 of the rear end opening, a pair of side surfaces 203, an interior bottom surface 204, and a pair of rear doors 205. The top portion 202 of the rear end opening 201, at least a portion of the side surfaces 203, and the interior bottom surface 204 may all include a ferromagnetic material. The cover 100 is mounted in an opening of the freight container 200 (FIG. 2A) and includes an upper end 101 having at least one magnet 102, a lower end 103, a pair of side edges 105, and a flap portion 111, as was described with reference to FIGS. 1A and 1B.

In an embodiment of the present disclosure, when the upper end 101 of the cover 100 is affixed to the top portion 202 of the rear end opening 201 of the freight container 200, both rear doors 205 of the freight container 200 may be closed to pinch the cover 100 at the bottom, where the portion of the lower end 103 extends beyond the bottom of the rear end opening 201 of the freight container 200. As such, a barrier is created to protect the freight from water and/or debris that might enter through cracks and gaps associated with the rear doors 205. In an embodiment, when the cover 100 is affixed to a freight container 200 as described, the cover is made taut.

As stated above, embodiments of the present disclosure can include a plurality of magnets 102, 110, and/or 113. The magnets 102, 110, and/or 113 can range in size (e.g., about 1 to 5 inches) and shape (e.g., discs, squares, rectangles). In an embodiment, the magnets 102, 110, and/or 113 are discs about 3 inches in diameter. In another embodiment, the magnets 102, 110, and/or 113 are about 3 inches long and 3 inches wide. The plurality of magnets 102 can be specified to have dimensions that allow for flexibility in the upper end 101 of the cover. These dimensions are examples only, and the magnets may differ from the sizes discussed, depending on the need. In addition, in the event the freight container 200 does not include a ferromagnetic material at the top portion 202 of its rear end opening, the cover 100 may be draped over a load bar (not shown).

In one embodiment, the magnets 102 are affixed directly to the upper end 101 of the cover 100 with an adhesive. In another embodiment, the magnets 102 are sewn into a lip 109 of the upper end 101 of the cover 100. In an embodiment, the magnets 110 and 113 are similarly affixed to the respective parts of the cover 100. Alternatively, the magnets may be affixed to the cover 100 using some other approach.

In an embodiment of the present disclosure, the magnets 102 are spaced horizontally along the upper end 101 of the cover about 2 to 18 inches apart. In another embodiment, the magnets 102 are evenly spaced about 10 inches apart. In an embodiment, the magnets 113 are affixed to the bottom side portions of the flap portion 111 (e.g., the magnets do not run the entire length of the flap portion). Although specific dimensions are mentioned herein, it is understood that the magnets 102 may be spaced in some other manner.

Embodiments of the present disclosure include a re-useable cover for protecting freight while in transit that is waterproof and/or water resistant. Also, the re-useable cover may be constructed from tear resistant material. For example, the cover comprises a fabric such as ripstop fabric, ripstop nylon fabric, nylon fabric, waterproof fabric, water resistant fabric, and/or a combination thereof, or other materials. Alternatively, the cover may comprise a fabric that is not waterproof, or that may be partially waterproof or water resistant.

Embodiments of the present disclosure include a re-useable cover 100 for protecting freight while in transit where the width of the cover is about 8 to about 14 feet (e.g., about 10 to 12 feet, about 12 feet), and the height (length) of the cover is about 8 feet to about 18 feet (e.g., about 10 to 15.5 feet, about 15.5 feet), to cover the opening of a typical freight container such as those used in typical trucking configurations. It is understood that the above dimensions are merely examples and that the re-useable cover 100 may be constructed to have any appropriate dimensions for a given container opening. In another embodiment, the cover weighs less than about 30 pounds so as to add minimal weight to the load and/or to be manageable by one individual. Specifically, the weight of the re-useable cover 100 is specified to weigh less than about 30 pounds, for example, to allow a single person to install the re-useable cover 100 in the opening of a given freight container without expending an undue amount of effort.

Embodiments of the present disclosure include a cover for protecting freight while in transit where the freight container may comprise, for example, a tractor trailer, an intermodal container, an international freight box, an ISO container, a shipping container, and/or other type of container.

Next, a general description of the operation of the various components of the cover 100 is provided. To begin, the upper end 101 of the cover 100 is attached to a top portion 202 of the rear end opening 201 of a freight container 200. Next, at least one of the side straps 107 is affixed to an interior side surface 203 of the freight container. A flap portion 111 comprising at least one magnet 113 affixed to a lower portion of a back surface 112 of the cover 100 is attached to an interior bottom surface 204 of the freight container 200. A pair of doors 205 of the rear end opening 201 of the freight container 200 are then closed so that a lower portion 104 of the cover is pinched by the doors 205 and the cover 100 extends beyond a bottom 206 of the rear end opening 201 of the freight container 200 (see FIG. 2C). Freight is then transported, and once the freight has reached its intended destination, the doors 205 are opened and the cover 100 is removed from the freight container 200 to access the contents of the container. The cover 100 then may be folded for storage and/or transport and eventually re-used.

Although the cover 100 is described above of comprising magnets for attachment to the freight container, other approaches may be employed to attach the cover 100 to the freight container. For example, the upper end 101 of the cover 100 may comprise portions of snaps for attachment to a freight container that mate with opposing portions of snaps that are pre-installed or otherwise adhered to the freight container. In other embodiments, other types of fasteners may be employed such as hooks that attach to bars or loops, hook and loop structures such as VELCRO™, and other fasteners. In another embodiment, the cover 100 may include a bar (e.g., similar to a load bar) that extends and supports the cover 100 near the top of the freight container. In this embodiment, the cover 100 may be wrapped around the bar for storage. Additionally, the cover 100 may include a spring mechanism that would allow the cover 100 to be wrapped up around the bar in a retractable configuration. In another embodiment, the freight container may be pre-installed with the cover 100.

In addition, in another embodiment the cover 100 may be configured to extend from one side of the freight container to the other side, thereby making it useful with freight containers that include overhead doors. In this configuration, a load bar may be installed on one side of the freight container from the ceiling to the floor. The cover 100 may be attached to such a load bar and pulled across the opening in the freight container. The loose side of the cover 100 may then be attached to the other side of the freight container via magnets, snaps, hooks, or other fastener(s).

Further, the cover 100 of the present disclosure may also be used with freight containers having doors positioned at any location on the freight container. For example, the cover 100 may be employed to cover an opening presented by side entry doors of a freight container.

In an embodiment, the side straps 107 of the cover 100 can be used to aid in securing the folded cover for transport and/or storage when the cover is not in use. In another embodiment, the cover, when folded, is compact and easily portable. In another embodiment, the cover 100 together with the freight container 200 comprise a freight protection system.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A freight protection system, comprising:
    a freight container comprising:
        a rear end opening, wherein a top portion of the opening comprises a ferromagnetic material;
        a pair of side surfaces, wherein at least a portion of the side surfaces comprise a ferromagnetic material;
        an interior bottom surface, wherein at least a portion of the interior bottom surface comprises a ferromagnetic material;
        a pair of doors of the rear end opening; and
    a waterproof cover comprising:
        an upper end, wherein the upper end comprises at least one magnet for attachment to the top of the rear end opening of the freight container;
        a lower end with a lower portion configured to extend beyond a bottom of the rear end opening of the freight container when the pair of doors of the rear end opening of the freight container are closed;
        a pair of side edges, each side edge being configured to be positioned adjacent to a respective side of the rear end opening of the freight container when the upper end is attached to the top of the rear end opening of the freight container;
        at least one strap affixed to each of the two side edges of the cover comprising at least one magnet and attached to an interior side surface of the freight container; and
        a flap portion comprising at least one magnet affixed to a lower portion of a back surface of the cover, wherein the flap portion is configured to be affixed to a bottom surface of the interior of the freight container when the upper end of the cover is attached to the top of the rear end opening of the freight container.

2. The freight protection system of claim 1, wherein when the upper end is affixed to the top of the rear end opening of the freight container, both rear doors of the freight container are closed, and the portion of the lower end extends beyond the bottom of the rear end opening of the freight container, thereby creating a barrier to protect the freight from at least one of water or debris entering through a gap in the doors.

3. A re-usable cover for protecting freight while in transit comprising:
    an upper end, wherein the upper end comprises at least one magnet for attachment to the top of a rear end opening of a freight container;
    a lower end with a lower portion configured to extend beyond a bottom of the rear end opening of the freight container;
    a pair of side edges, each side edge being configured to be positioned adjacent to a respective side of the rear end opening of the freight container when the upper end is attached to the top of the rear end opening of the freight container; and
    a front surface configured to face the exterior of the freight container when the upper end is attached to the top of the rear end opening of the freight container.

4. The re-useable cover for protecting freight while in transit of claim 3, wherein the re-useable cover is waterproof.

5. The re-usable cover for protecting freight while in transit of claim 3, wherein the at least one magnet comprises a plurality of magnets spaced horizontally and affixed to a lip of the upper end of the re-useable cover.

6. The re-useable cover for protecting freight while in transit of claim 5, wherein the plurality of magnets are spaced horizontally about 10 inches apart.

7. The re-useable cover for protecting freight while in transit of claim 5, wherein the plurality of magnets are each about 3 inches long and about 3 inches wide.

8. The re-useable cover for protecting freight while in transit of claim 3, wherein at least one strap is affixed to each of the two side edges.

9. The re-useable cover for protecting freight while in transit of claim 8, wherein the at least one strap comprises a buckle for adjusting the length of the strap.

10. The re-useable cover for protecting freight while in transit of claim 8, wherein the at least one strap comprises at least one magnet.

11. The re-useable cover for protecting freight while in transit of claim 3, further comprising:
    a flap portion affixed to a lower portion of a back surface of the cover; and
    at least one magnet affixed to a bottom end of the flap portion.

12. The re-useable cover for protecting freight while in transit of claim 11, wherein the flap portion is configured to be affixed to a bottom surface of the interior of the freight container when the upper end of the cover is attached to the top of the rear end opening of the freight container.

13. The re-useable cover for protecting freight while in transit of claim 3, wherein the re-useable cover is tear resistant.

14. A method of using a re-useable cover for protecting freight while in transit comprising the steps of:
    attaching an upper end of the cover to a top portion of a freight container;
    attaching a flap portion comprising at least one magnet affixed to a lower portion of a back surface of the cover to a bottom surface of the interior of the freight container; and
    closing a pair of doors of the rear end opening of the freight container so that a portion of the cover is pinched by the doors and the cover extends beyond a bottom of the rear end opening of the freight container.

15. The method of using there-useable cover for protecting freight while in transit of claim 14, wherein the freight container is selected from the group consisting of: a tractor trailer, an intermodal container, an international freight box, an ISO container, or a shipping container.

16. The method of using the re-useable cover for protecting freight while in transit of claim 14, wherein the cover comprises fabric selected from the group consisting of: ripstop fabric, ripstop nylon fabric, nylon fabric, waterproof fabric, water resistant fabric, and a combination thereof.

17. The method of using the re-usable cover for protecting freight while in transit of claim 14, further comprising the step of attaching at least one strap affixed to each of two side edges of the cover to an interior side surface of the freight container.

18. The method of using the re-useable cover for protecting freight while in transit of claim 14, wherein the at least one strap comprises at least one magnet and is attached to an interior side surface of the freight container with the at least one magnet.

19. The method of using the re-useable cover for protecting freight while in transit of claim 14, wherein the width of the cover is about 10 to 12 feet.

20. The method of using the re-useable cover for protecting freight while in transit of claim 14, wherein the height of the cover is about 10 to 15.5 feet.

21. The method of using the re-useable cover for protecting freight while in transit of claim 14, wherein the cover weighs less than about 30 pounds.

* * * * *